US010155902B2

(12) United States Patent
Salla et al.

(10) Patent No.: US 10,155,902 B2
(45) Date of Patent: Dec. 18, 2018

(54) SILANE ADDITIVES FOR IMPROVED SAND STRENGTH AND CONDUCTIVITY IN FRACTURING APPLICATIONS

(71) Applicant: Halliburton Energy Services, Inc., Houston, TX (US)

(72) Inventors: Rajender Salla, Pune (IN); Neelam Deepak Raysoni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/500,846

(22) PCT Filed: Sep. 24, 2014

(86) PCT No.: PCT/US2014/057229
§ 371 (c)(1),
(2) Date: Jan. 31, 2017

(87) PCT Pub. No.: WO2016/048302
PCT Pub. Date: Mar. 31, 2016

(65) Prior Publication Data
US 2017/0218263 A1  Aug. 3, 2017

(51) Int. Cl.
*E21B 43/267* (2006.01)
*C09K 8/80* (2006.01)
(Continued)

(52) U.S. Cl.
CPC ............. *C09K 8/805* (2013.01); *C09K 8/426* (2013.01); *C09K 8/56* (2013.01); *C09K 8/62* (2013.01); *E21B 43/26* (2013.01); *E21B 43/267* (2013.01)

(58) Field of Classification Search
CPC .............................. C09K 8/805; E21B 43/267
See application file for complete search history.

(56) References Cited

U.S. PATENT DOCUMENTS 4,074,536 A * 2/1978 Young .................. C09K 8/56
166/295
4,374,742 A * 2/1983 Evans .................. C07F 7/182
508/202
(Continued)

FOREIGN PATENT DOCUMENTS

EP   0909874 A2   4/1999
GB   2030581 A * 4/1980 .............. C07F 7/182
(Continued)

OTHER PUBLICATIONS

International Search Report and Written Opinion issued in corresponding PCT application No. PCT/US2014/057229, dated Jun. 15, 2015, 16 pgs.
(Continued)

*Primary Examiner* — Catherine Loikith
(74) *Attorney, Agent, or Firm* — Chamberlain Hrdlicka

(57) ABSTRACT

Compositions using hardened resins as coatings for proppant particles. The methods for treating a subterranean formation with the coated proppant particles include the step of treating a subterranean formation with a composition that includes proppant particles that are coated with the hardened resin. The hardened resin is a cured product of a curable epoxy resin, a hardening agent, and an organosilicon compound.

20 Claims, 2 Drawing Sheets

(51) Int. Cl.
*C09K 8/42* (2006.01)
*C09K 8/56* (2006.01)
*C09K 8/62* (2006.01)
*E21B 43/26* (2006.01)

(56) References Cited

U.S. PATENT DOCUMENTS

| | | |
|---|---|---|
| 5,924,488 A | 7/1999 | Nguyen et al. |
| 7,461,697 B2 | 12/2008 | Todd et al. |
| 8,568,524 B2 | 10/2013 | Li et al. |
| 8,586,688 B2 | 11/2013 | Okamoto et al. |
| 8,617,704 B2 | 12/2013 | Piaseik et al. |
| 8,637,412 B2 | 1/2014 | Grill et al. |
| 8,642,708 B2 | 2/2014 | Stanjek et al. |
| 8,647,317 B2 | 2/2014 | Tian et al. |
| 8,664,329 B2 | 3/2014 | Liu |
| 8,686,064 B2 | 4/2014 | Shimp et al. |
| 2003/0102128 A1 | 6/2003 | Dawson et al. |
| 2003/0121999 A1 | 7/2003 | Nguyen et al. |
| 2003/0194517 A1 | 10/2003 | Shi et al. |
| 2011/0201727 A1 | 8/2011 | Hashemzadeh et al. |
| 2013/0081812 A1 | 4/2013 | Green et al. |
| 2016/0340574 A1* | 11/2016 | Vo .......................... C09K 8/805 |
| 2017/0096598 A1* | 4/2017 | Vo .......................... C09K 8/887 |

FOREIGN PATENT DOCUMENTS

| | | | |
|---|---|---|---|
| WO | 9413584 | 6/1994 | |
| WO | WO-2015147775 A1 * | 10/2015 | ............. C09K 8/805 |

OTHER PUBLICATIONS

Norman et al., "Application of Curable Resin-Coated Proppants," SPE Production Engineering, Nov. 1992: pp. 343-349.

\* cited by examiner

SILANE ADDITIVES FOR IMPROVED SAND STRENGTH AND CONDUCTIVITY IN FRACTURING APPLICATIONS

BACKGROUND OF THE INVENTION

Hydrocarbon-producing wells are often stimulated by hydraulic fracturing treatments. In hydraulic fracturing treatments, a viscous fracturing fluid, which also functions as a carrier fluid, is pumped into a producing zone to be fractured at a rate and pressure such that one or more fractures are formed in the zone. Particulate solids for propping open the fractures, commonly referred to in the art as "proppant," are generally suspended in at least a portion of the fracturing fluid so that the particulate solids are deposited in the fractures when the fracturing fluid flows back as a low viscosity broken fluid to the surface. The proppant deposited in the fractures functions to prevent the fractures from fully closing and maintains conductive channels through which produced hydrocarbons can flow.

After the fracturing fluid, which is the carrier fluid for the proppant, deposits the proppant in the fracture, the fracture closes on the proppant. Such partially closed fractures apply pressure on proppant particles. For this purpose, the interstitial space between particles should be sufficiently large, yet the particles should possess the mechanical strength to withstand closure stresses to hold fractures open after the fracturing pressure is withdrawn. Thus, for instance, large mesh proppants exhibit greater permeability than small mesh proppants at low closure stresses, but they will mechanically fail and thereby produce very fine particulates ("fines") at high closure pressures.

High production wells often experience proppant flow back after hydraulic fracturing operations. Flow back is more severe in high production wells. If the proppant flows back into the well bore, then the width of the fracture decreases and thereby limits the flow channel conductivity, impairing the effectiveness of the fracturing treatment. In addition, produced proppant also erodes production equipment leading to economic loss attributed to repairs and treatment processes.

It is generally accepted that an unconfined compressive strength of about 150 psi is sufficient to control proppant flow back in high producing wells with moderate temperatures (Applications of Curable Resin-Coated Proppant, Production Engineering, November 1992, 343-349). For a consolidated proppant pack to succeed over the long term, the consolidation strength must be maximized yet be flexible enough to withstand repeated stress cycles that occur during production in reservoir conditions.

In this context, natural sand is widely used as a proppant in reservoirs with lower overburden stresses. Yet, because natural sand is economical and plentiful in supply, it is increasingly used as a proppant in reservoirs with intermediate to higher overburden stresses. Consequently, natural sand used in these more extreme conditions gives rise to the problems discussed above. Since natural sand cannot be used effectively for reservoirs with intermediate and higher overburden stresses, man-made proppants are used. However, even man-made proppant gives rise to fines generation under higher over burden stresses.

To mitigate the foregoing issues, those who are skilled in the art can employ curable resin coatings on proppant particles. Some resin systems can maximize bonding between proppant particles and maximize consolidation strength of the proppant pack whilst maintaining proppant conductivity.

Against this background, natural sand poses a difficult challenge as a proppant: it is naturally irregular in shape and, hence, it is difficult to achieve uniform coating of sand particles. Non-uniform coating on natural sand also decreases the overall strength of the proppant and allows the generation of fines. It is difficult moreover to design a single resin system that is useful for both low and high temperature wells.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
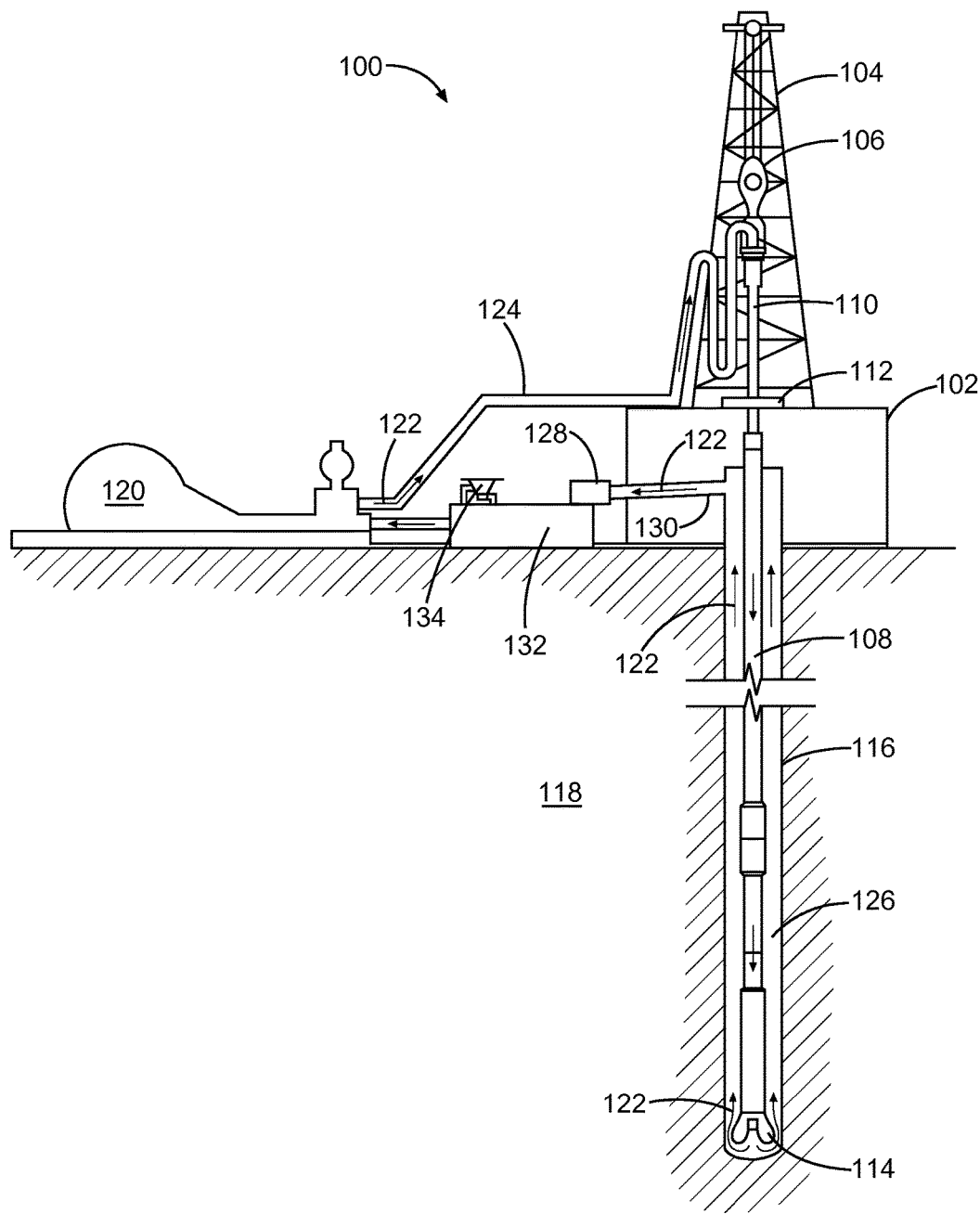
FIG. 1 illustrates a drilling assembly in accordance with various embodiments.

In satisfying the needs described above, the present invention provides a hardened resin-coated proppant composition and its method of use in treating a subterranean formation, such as in fracking operations in hydrocarbon wells.

Reference will now be made in detail to certain embodiments of the disclosed subject matter, examples of which are illustrated in part by the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

"Alkyl" refers to straight, branched chain, or cyclic hydrocarbyl groups including from 1 to about 20 carbon atoms. For instance, an alkyl can have from 1 to 10 carbon atoms or 1 to 5 carbon atoms. Exemplary alkyl includes straight chain alkyl groups such as methyl, ethyl, propyl, butyl, pentyl, hexyl, heptyl, octyl, nonyl, decyl, undecyl, dodecyl, and the like, and also includes branched chain isomers of straight chain alkyl groups, for example without limitation, —CH(CH$_3$)$_2$, —CH(CH$_3$)(CH$_2$CH$_3$), —CH(CH$_2$CH$_3$)$_2$, —C(CH$_3$)$_3$, —C(CH$_2$CH$_3$)$_3$, —CH$_2$CH(CH$_3$)$_2$, —CH$_2$CH(CH$_3$)(CH$_2$CH$_3$), —CH$_2$CH(CH$_2$CH$_3$)$_2$, —CH$_2$C(CH$_3$)$_3$, —CH$_2$C(CH$_2$CH$_3$)$_3$, —CH(CH$_3$)CH(CH$_3$)(CH$_2$CH$_3$), —CH$_2$CH$_2$CH(CH$_3$)$_2$, —CH$_2$CH$_2$CH(CH$_3$)(CH$_2$CH$_3$), —CH$_2$CH$_2$CH(CH$_2$CH$_3$)$_2$, —CH$_2$CH$_2$C(CH$_3$)$_3$, —CH$_2$CH$_2$C(CH$_2$CH$_3$)$_3$, —CH(CH$_3$)CH$_2$CH(CH$_3$)$_2$, —CH(CH$_3$)CH(CH$_3$)CH(CH$_3$)$_2$, and the like. Thus, alkyl groups include primary alkyl groups, secondary alkyl groups, and tertiary alkyl groups.

The phrase "substituted alkyl" refers to alkyl substituted at 1 or more, e.g., 1, 2, 3, 4, 5, or even 6 positions, which substituents are attached at any available atom to produce a stable compound, with substitution as described herein. "Optionally substituted alkyl" refers to alkyl or substituted alkyl.

The term "aryl," alone or in combination refers to an aromatic monocyclic or bicyclic ring system such as phenyl or naphthyl. "Aryl" also includes aromatic ring systems that are optionally fused with a cycloalkyl ring as herein defined.

A "substituted aryl" is an aryl that is independently substituted with one or more substituents attached at any available atom to produce a stable compound, wherein the substituents are as described herein. "Optionally substituted aryl" refers to aryl or substituted aryl.

The term "heteroatom" refers to N, O, and S. Inventive compounds that contain N or S atoms can be optionally oxidized to the corresponding N-oxide, sulfoxide or sulfone compounds.

An alkyl as defined herein can be interrupted by one or more heteroatoms, thereby defining a heteroalkyl group, meaning a saturated alkyl group having from 1 to about 20 carbon atoms, 1 to 10 carbon atoms, 1 to 6 carbon atoms, or 1 to 3 carbon atoms, in which from 1 to 3 carbon atoms are replaced by heteroatoms of O, S or N, such as —NH—. Heteroalkyl is also intended to include oxidized S or N, such as sulfinyl, sulfonyl and N-oxide of a tertiary ring nitrogen. The point of attachment of the heteroalkyl substituent is at an atom such that a stable compound is formed. Examples of heteroalkyl groups include, but are not limited to, N-alkylaminoalkyl (e.g., CH$_3$NHCH$_2$—), N,N-dialkylaminoalkyl (e.g., (CH$_3$)$_2$NCH$_2$—), and the like.

The term "cycloalkyl" refer to monocyclic, bicyclic, tricyclic, or polycyclic, 3- to 14-membered ring systems, which are either saturated, unsaturated or aromatic. The cycloalkyl group may be attached via any atom. Cycloalkyl also contemplates fused rings wherein the cycloalkyl is fused to an aryl or hetroaryl ring as defined above. Representative examples of cycloalkyl include, but are not limited to cyclopropyl, cyclobutyl, cyclopentyl, and cyclohexyl. A cycloalkyl group can be unsubstituted or optionally substituted with one or more substituents as described herein below.

Any alkyl, aryl, or cycloalkyl in Formula I is optionally substituted with one or more members selected from the group consisting of halogen, oxo, —COOH, —CN, —NO$_2$, —OH, —NR$^a$R$^b$, —NR$^c$S(O)$_2$R$^d$, (C$_1$-C$_6$)alkoxy, and (C$_3$-C$_{14}$)aryloxy. Substituents R$^a$, R$^b$, R$^c$, and R$^d$ are independently selected from the group consisting of H, straight or branched (C$_1$-C$_6$)alkyl, (C$_3$-C$_{14}$)aryl(C$_1$-C$_6$)alkylene-, (C$_1$-C$_6$)alkoxy, (C$_3$-C$_{14}$)aryl, (C$_1$-C$_6$)hydroxyalkyl, (C$_1$-C$_6$)aminoalkyl, H$_2$N(C$_1$-C$_6$)alkylene-, (C$_3$-C$_6$)cycloalkyl, (C$_3$-C$_{14}$)heterocycloalkyl, (C$_3$-C$_{14}$)heteroaryl, (C$_3$-C$_{14}$)aryl-(C$_1$-C$_6$)alkylene-, NR'R"C(O)—, and (C$_3$-C$_6$)aryl-(C$_3$-C$_{14}$)-cycloalkylene-, and R' and R" can each independently be selected from the group consisting of H, (C$_1$-C$_8$)alkyl, and (C$_3$-C$_6$)aryl.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In one embodiment, the invention provides a composition comprising a hardened resin that is coated on at least a portion of proppant particles. The hardened resin comprises three major components, a curable epoxy resin, a hardening agent, and an organosilicon compound, respectively.

In some embodiments, the organosilicon compound is an organosilane. Examples are selected from an aminosilane, an epoxy silane, an organohalogen silane, an organosilane ester, a silyl acetamide, a cyclosiloxane, a cyclosilazane, a silazane, and combinations thereof.

Structural characteristics of the organosilicon compound, according to various embodiments, suitably include Si—OH groups or moieties such as Si—OR or Si—X (where R is an alkyl, cycloalkyl, or aryl; X is halo such as Cl) that are readily hydrolyzed to Si—OH groups either before or during the resin curing process. The Si—OH groups can promote cross-linking between resin-coated proppant particles. In addition, the Si—OH groups can participate in hydrogen-bonding with hydroxyl groups on the surfaces of natural sand proppant particles.

In some embodiments, the organosilicon compound conforms to Formula I:

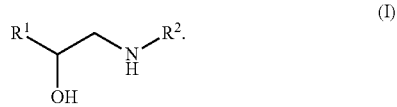

In Formula I compounds, $R^1$ and $R^2$ are independently selected from optionally substituted alkyl and optionally substituted aryl. Each instance of optionally substituted alkyl is optionally interrupted by one or more of O, S, and —NH—. In addition, at least one of $R^1$ and $R^2$ is substituted by at least one moiety of the formula —Si(OR)$_n$X$_{3-n}$ wherein each R is independently selected from OH, alkyl, cycloalkyl, and aryl, and wherein at least one R is OH. Variable X is halo, such as F, Cl, Br, or I. Variable n is an integer that is 1, 2, or 3.

In other embodiments, the organosilicon compound is a siloxane, such as one resulting from the self-condensation of one or more silanes bearing Si—OH groups.

Examples of aminosilanes according to other embodiments include amino silanes such as aminopropyltrimethoxysilane, aminopropyltriethoxysilane, aminopropyl-methyl-dimethoxysilane, aminopropyl-methyldiethoxysilane, N-(2-aminoethyl)aminopropyltrimethoxysilane, N-(2-aminoethyl)aminopropyltrimethoxysilane, N-(2-aminoethyl)aminopropyltriethoxysilane, N-(2-aminoethyl)aminopropyl-methyldimethoxysilane, N-cyclohexylaminomethyltriethoxysilane, N-cyclohexylaminomethyl-methyldiethoxysilane, N-cyclohexylaminomethyl-trimethoxysilane, and N-cyclohexylaminomethyl-methyldimethoxysilane.

Illustrative epoxysilanes are beta-(3-4-epoxy-cyclohexyl) ethyltrimethoxysilane and gamma-glycidoxypropyl-trimethoxysilane. Further examples of epoxysilanes include glycidoxypropyltrimethoxysilane, glycidoxypropyltriethoxysilane, glycidoxypropylmethyldimethoxysilane, glycidoxypropylmethyldiethoxysilane, epoxycyclohexylethyl-trimethoxysilane, and epoxysilane-modified melamine.

In various embodiments, the curable epoxy resin is any suitable class of epoxy resin. Examples of epoxy resins include, or are a product of reaction between, one or more epichlorohydrin, bisphenol A or F, novolac epoxy resins, glycidyl epoxy resins, cycloaliphatic epoxides, and glycidylamine epoxy resins.

In some embodiments, the curable epoxy resin includes the product of reaction between epichlorohydrin, bisphenol A, and a plant oil. The plant oil, according to some embodiments, is one selected from a vegetable oil, an epoxidised vegetable oil, an epoxy derivative of a monoglyceride of vegetable oil, fruit oil, and wood oil. The plant oil also can be any combination of one or more these oils. Exemplary plant oils according to various embodiments include but are not limited to linseed oil, soybean oil, palm oil, coconut oil, argemone oil, pongamia oil, jatropha oil, laurel oil, neem oil, cottonseed oil, vernonia oil, *Annona squamosa* oil, *Catunaregam nilotica* oil, rubber seed oil, crabe oil, *J. curcas* oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof. For instance, per one embodiment, the plant oil is soybean oil.

In another embodiment, the curable resin is a polyepoxide resin. In some embodiments, the curable resin is a combination two types of resins as described herein.

The hardening agent is any suitable compound useful for curing epoxide resins. For instance, according to some embodiments of the invention the hardening agent is selected from diethyl toluene diamine, a cycloalkylamine, 4,4'-Diaminodiphenylsulfone, polyethylene amine, and 3-(aminomethyl)-3,5,5-trimethylcyclohexanamine. According to other embodiments, the hardening agent is a composition comprising a polyamine, ethylene diamine, and bisphenol A. Still other embodiments contemplate a combination of two or more of the hardening agents described herein.

Specific combinations of curable resin and hardening agent according to some embodiments include but are not limited to the following: (1) curable resin is polyepoxide resin and the hardening agent is a cycloalkylamine; (2) curable resin is the product of reaction between epichlorohydrin and bisphenol A, and the hardening agent is diethyl toluene diamine; (3) curable resin is the product of reaction between epichlorohydrin and bisphenol A, and the hardening agent is 3-(aminomethyl)-3,5,5-trimethylcyclohexanamine; (4) curable resin is the product of reaction between epichlorohydrin and bisphenol A, and the hardening agent is 4,4'-diaminodiphenylsulfone; and (5) curable resin is the product of reaction between epichlorohydrin and bisphenol A, and the hardening agent is polyethylene amine. Various embodiments contemplates all combinations of curable resin and hardening agents described in specific embodiments (1)-(5) above.

The weight ratio of curable resin to hardening agent varies from about 8:2 to about 2:8, depending on variables such as reservoir temperature, intended cure time, and consolidation strength. The invention contemplates all intermediate ratios and sub-ranges. For instance, the ratio in one embodiment is about 8:2 to about 1:2, and about 8:2 to about 1:3. In other embodiments, the ratio is about 8:2 to about 3:2, about 8:2 to about 4:2, or about 8:2 to about 5:2. Some embodiments provide for a ratio of about 7:2 to about 5:2. An exemplary ratio as illustrated in more detail below is about 7:3.

The concentration of organo silicon compound is suitable over a wide range. In various embodiments, for example, the concentration in the composition is one selected within the range of about 0.1% to about 10% by volume, based on the total weight of the composition. More specifically, the concentration is about 1% to about 5% or about 2% to about 3%, according to other embodiments.

To achieve effective proppant consolidation, it is not necessary for every proppant particle to be coated with the hardened resin. Rather, in some embodiments, it is sufficient for at least a portion of the particles to be coated. In still other embodiments, all proppant particles are uniformly coated with the hardened resin. Within these general guidelines, the proppant composition comprises the hardened resin in a concentration of about 0.5% to about 10% by volume, based upon the total weight of the proppant composition. In some embodiments, the concentration is about 1% to about 5%. Other embodiments provide for a concentration of about 1%, 2%, 3%, 4%, and 5%. An exemplary concentration is about 2 to about 3%, such as about 2% or 3%.

The composition described herein generally is manufactured, per one embodiment, by first mixing the curable epoxy resin, hardening agent, and organosilicon compound in the desired proportions. The resulting mixture is then mixed with proppant particles to ensure uniform coating of the mixture onto proppant particle surfaces. The resin coating can be cured by subjecting it to heat, thereby producing a hardened resin coating on the proppant particles to form a consolidated proppant. In some embodiments, the curable resin is at least partially or fully cured prior to contacting of the coated proppant into a subterranean formation. In other embodiments, the curing occurs after such contacting.

In some embodiments, curable epoxy resin, hardening agent, and organosilicon compound are mixed together, combined with sand, and mixed to uniformly coat the resin and hardening agent mixture onto the sand. Various orders of addition and mixing are contemplated. For instance, per another embodiment, sand is coated with hardener initially, then with epoxy resin, and finally with organosilicon compound. Alternatively, per another embodiment, the sand is coated with epoxy resin initially, then with hardener, and finally with organosilicon compound. Per another embodiment, the sand is treated with organosilicon compound, then resin and finally hardener. Treatment may involve simply mixing the sand with organosilicon compound and/or heating to form a dehydrated product that is used with resin and hardener composition.

Following any of the dry coating methods described above, in still other embodiments, the coated proppant such as sand is suspended in a viscous fracturing gel to carry downhole for placement in a fracture and then allowed to cure. In some embodiments, fracture fluid itself is added with curable epoxy resin, hardening agent, and organosilicon compound followed by suspending the sand to place it in downhole for curing. In other embodiments, curable epoxy resin is coated onto the sand and hardening agent and organosilicon compound are mixed with fracture fluid, then suspended with viscous gel to pump down hole. In still other embodiments, hardening agent is coated onto the sand and curable resin and organosilicon compounds are mixed with fracture gel then suspended and pumped downhole.

Per another embodiment, the proppant is first mixed thoroughly with curable epoxy resin to coat the proppant, hardening agent is added to the curable resin-coated proppant, and the resulting combination is mixed with organosilicon compound thoroughly to ensure sufficient coating. Alternatively, the proppant is instead first mixed and coated with hardening agent, curable resin is added to the hardening agent-coated proppant, and the combination is mixed thoroughly with organosilicon compound to ensure sufficient coating.

Any convenient heat source is suitable for curing the resin coating, such as natural sources of heat encountered in subterranean formations where the proppant composition is injected. Alternatively, heat can be supplied by contacting the resin-coated proppant particles in a subterranean formation with heated aqueous or hydrocarbon-based fluids as described herein.

One advantage of the composition is that the organosilicon compound confers enhanced strength by promoting strong bonds with sand and extending bond formation between sand grains. Another advantage is that any fines can be agglomerated by the composition, thereby promoting high strength and conductivity. Still another advantage is the ready supply of a wide range of organosilicon compounds and resulting ability to tune the composition for use in a wide range of operations and resin systems. A particular advantage of the composition is that irrespective of coating thickness on sand grains, a coated sand proppant according to the invention provides high strength and conductivity while maintaining excellent grain-to-grain contact.

Method of Treating a Subterranean Formation

One embodiment of the present invention is a method of treating a subterranean formation, comprising contacting the formation with the composition described herein. In some embodiments, the composition is used in well completion operations, such as primary proppant treatments for immobilizing proppant particulates (e.g., hydraulic fracturing, gravel packing, and frac-packing), remedial proppant/gravel treatments, near-wellbore formation sand consolidation treatments for sand control, consolidating-while-drilling target intervals, and plugging-and-abandonment of wellbores in subterranean formations.

Per another embodiment, the method further includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In still another embodiment, the method further comprises hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing occurs before, during, and/or after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In one embodiment, the fluid composition comprises a carrier fluid. Any suitable proportion of the composition can be one or more downhole fluids or one or more carrier fluids. In some embodiments about 0.001 wt % to about 99.999 wt % of the composition is a downhole fluid or carrier liquid, or about 0.1 wt % to about 80 wt %, or about 1 wt % to about 50 wt %, or about 1 wt % or more of the composition, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more.

In some embodiments, the composition comprises one or more surfactants. The surfactant facilitates the coating of the proppant composition on a subterranean surface causing the composition to flow into fractures and/or flow channels within the subterranean formation. The surfactant is any suitable surfactant present in any suitable proportion of the composition, such that the composition can be used as described herein. For example, about 0.000.1 wt % to about 20 wt % of the composition constitutes one or more surfactants, about 0.001 wt % to about 1 wt %, or about 0.000.1 wt % or less, or about 0.001 wt %, 0.005, 0.01, 0.02, 0.04, 0.06, 0.08, 0.1, 0.2, 0.3, 0.4, 0.5, 0.6, 0.8, 1, 2, 3, 4, 5, 6, 7, 8, 9, 10, 11, 12, 13, 14, 15, 16, 17, 18, 19, or about 20 wt % or more.

In some embodiments, the surfactant is at least one of a cationic surfactant, an anionic surfactant, and a non-ionic surfactant. In some embodiments, the ionic groups of the surfactant include counter-ions, such that the overall charge of the ionic groups is neutral, whereas in other embodiments, no counterion is present for one or more ionic groups, such that the overall charge of the one or more ionic groups is not neutral.

In some embodiments, the composition further comprises a hydrolyzable ester. The hydrolyzable ester is any suitable hydrolyzable ester. For example, the hydrolyzable ester is a $C_1$-$C_5$ mono-, di-, tri-, or tetra-alkyl ester of a $C_2$-$C_{40}$ mono-, di-, tri-, or tetra-carboxylic acid. The hydrolyzable ester is one of dimethylglutarate, dimethyladipate, dimethylsuccinate, sorbitol, catechol, dimethylthiolate, methyl salicylate, dimethylsalicylate, and tert-butylhydroperoxide. Any suitable wt % of the composition or a cured product thereof is the hydrolyzable ester, such as about 0.01 wt % to about 20 wt %, or about 0.1 wt % to about 5 wt %, or about 0.01 wt % or less, or about 0.1 wt %, 1, 2, 3, 4, 5, 6, 8, 10, 12, 14, 16, 18, or about 20 wt % or more.

In other embodiments, the composition comprises at least one tackifier. The tackifier can be any suitable wt % of the composition or cured product thereof, such as about 0.001 wt % to about 50 wt %, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The tackifier is any suitable material having tackiness. For example, the tackifier is an adhesive or a resin. The term "resin" as used herein refers to any of numerous physically similar polymerized synthetics or chemically modified natural resins including thermoplastic materials and thermosetting materials. In some embodiments, the tackifier is at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin.

In some embodiments, the tackifier is one of bisphenol A diglycidyl ether resin, butoxymethyl butyl glycidyl ether resin, bisphenol A-epichlorohydrin resin, and bisphenol F resin. In other embodiments, the tackifier is one of an acrylic acid polymer, an acrylic acid ester polymer, an acrylic acid homopolymer, an acrylic acid ester homopolymer, poly (methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In still other embodiments, the tackifier is a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the tackifier includes an amine-containing polymer and/or is hydrophobically-modified. In some embodiments, the tackifier includes one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification is any suitable hydrophobic modification, such as at least one $C_4$-$C_{30}$ hydrocarbyl including at least one of a straight chain, a branched chain, an unsaturated C—C bond, an aryl group, and any combination thereof.

In some embodiments where viscosity is modified, the composition includes one or more viscosifiers. The viscosifier is any suitable viscosifier. The viscosifier provides an increased viscosity of the composition before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition or a cured product thereof, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more.

The viscosifier includes at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. Exemplary viscosifiers include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$)alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparo san, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier is at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In some embodiments, the composition comprises one or more breakers. The breaker is any suitable breaker, such that the surrounding fluid (e.g., a fracturing fluid) is at least partially broken for more complete and more efficient recovery thereof, such as at the conclusion of the hydraulic fracturing treatment. In some embodiments, the breaker is encapsulated or otherwise formulated to give a delayed-release or a time-release breaker, such that the surrounding liquid remains viscous for a suitable amount of time prior to breaking. The breaker is any suitable breaker; such as a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker is at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyperchlorite ion. An enzymatic breaker is at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

In accordance with one embodiment, the composition comprises any suitable fluid in addition to those otherwise described herein. For example, the fluid is at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid constitutes about 0.001 wt % to about 99.999 wt % of the composition or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In other embodiments, the composition comprises a downhole fluid. The composition can be combined with any suitable downhole fluid before, during, or after the placement of the composition in the subterranean formation or the contacting of the composition and the subterranean material. In some examples, the composition is combined with a downhole fluid above the surface, and then the combined composition is placed in a subterranean formation or contacted with a subterranean material. In another example, the composition is injected into a subterranean formation to combine with a downhole fluid, and the combined composition is contacted with a subterranean material or is considered to be placed in the subterranean formation.

In some embodiments, the downhole fluid is an aqueous or oil-based fluid including a fracturing fluid, spotting fluid, clean-up fluid, completion fluid, remedial treatment fluid, abandonment fluid, pill, cementing fluid, packer fluid, or a combination thereof. The placement of the composition in the subterranean formation can include contacting the subterranean material and the mixture. The downhole fluid constitutes any suitable weight percent of the composition, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %.

In some embodiments, the composition includes an amount of any suitable material used in a downhole fluid. For example, the composition includes water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof.

In various embodiments, the composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A cement fluid includes an aqueous mixture of cement and/or cement kiln dust. The composition including the aryl component and the amine or epoxide component, or a cured product thereof, can form a useful combination with cement or cement kiln dust. The cement kiln dust is any suitable cement kiln dust. Cement kiln dust is formed during the manufacture of cement and can be partially calcined kiln feed that is removed from the gas stream and collected in a dust collector during a manufacturing process. Cement kiln dust is advantageously utilized in a cost-effective manner since kiln dust is often regarded as a low value waste product of the cement industry. Some embodiments of the cement fluid include cement kiln dust but no cement, cement kiln dust and cement, or cement but no cement kiln dust. The cement is any suitable cement. The cement can be a hydraulic cement, for instance. A variety of cements can be utilized in accordance with embodiments of the present invention; for example, those including calcium, aluminum, silicon, oxygen, iron, or sulfur, which can set and harden by reaction with water. Other suitable cements include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives are added to cement or kiln dust-containing composition of embodiments of the present invention as deemed appropriate by one skilled in the art, with the benefit of this disclosure. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives include crystalline silica compounds, amorphous silica, salts, fibers, hydratable clays, microspheres, pozzolan lime, thixotropic additives, and combinations thereof.

In accordance with another embodiment, the composition described herein comprises a binder. For instance, the binder is selected from the group consisting of hydrated aluminum-containing binders, titanium dioxide, hydrated titanium dioxide, clay minerals, alkoxysilanes, amphiphilic substances, graphite, and combinations thereof. Further examples of suitable binders include hydrated alumina or other aluminum-containing binders, mixtures of silicon and aluminum compounds such as disclosed in WO 94/13584; and silicon compounds.

Still further examples binders suitable for use in the invention include oxides of silicon, aluminum, boron, phosphorus, zirconium, and/or titanium. An illustrative binder, according to one embodiment, is silica, where the $SiO_2$ subunit is introduced into a shaping step as a silica sol or in the form of tetraalkoxysilanes, such in the formation of the shaped bodies described herein. Still further examples of binders include oxides of magnesium and of beryllium and clays, such as montmorillonites, kaolins, bentonites, halloysites, dickites, nacrites and anauxites. Tetraalkoxysilanes also are suitable for use as binders in the present invention. Specific examples include tetramethoxysilane, tetraethoxysilane, tetrapropoxysilane and tetrabutoxysilane. Tetraalkoxytitanium and tetraalkoxyzirconium compounds and trimethoxy-, triethoxy-, tripropoxy- and tributoxy-aluminum, tetramethoxysilane and tetraethoxysilane are still further examples of suitable binders.

System

In accordance with an embodiment, the invention provides a system that uses or that can be generated by use of an embodiment of the composition described herein in a subterranean formation, or that can perform or be generated by performance of a method for using the composition described herein. For instance, the system includes a composition and a subterranean formation including the composition therein. In some embodiments, the composition in the system includes a downhole fluid, or the system comprises a mixture of the composition and downhole fluid. In other embodiments, the system comprises a tubular and a pump configured to pump the composition into the subterranean formation through the tubular.

Some embodiments provide a system configured for delivering the composition described herein to a subterranean location and for using the composition therein, such as for a fracturing operation (e.g., pre-pad, pad, slurry, or finishing stages). In some embodiments, the system or apparatus includes a pump fluidly coupled to a tubular (e.g., any suitable type of oilfield pipe, such as pipeline, drill pipe, production tubing, and the like), the tubular containing a composition as described herein.

In some embodiments, the system comprises a drillstring disposed in a wellbore, the drillstring including a drill bit at a downhole end of the drillstring. The system can also include an annulus between the drillstring and the wellbore. Further, in accordance with one embodiment, the system includes a pump configured to circulate the composition through the drill string, through the drill bit, and back above-surface through the annulus. In some embodiments, the system includes a fluid processing unit configured to process the composition exiting the annulus to generate a cleaned drilling fluid for recirculation through the wellbore.

The pump is a high pressure pump in some embodiments. As used herein, the term "high pressure pump" refers to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps are known to one having ordinary skill in the art and can include floating piston pumps and positive displacement pumps.

In other embodiments, the pump is a low pressure pump. As used herein, the term "low pressure pump" refers to a pump that operates at a pressure of about 1000 psi or less. In some embodiments, a low pressure pump can be fluidly coupled to a high pressure pump that is fluidly coupled to the tubular. That is, in such embodiments, the low pressure pump is configured to convey the composition to the high pressure pump. In such embodiments, the low pressure pump can "step up" the pressure of the composition before it reaches the high pressure pump.

In some embodiments, the system described herein further includes a mixing tank that is upstream of the pump and in which the composition is formulated. In various embodiments, the pump (e.g., a low pressure pump, a high pressure pump, or a combination thereof) conveys the composition from the mixing tank or other source of the composition to the tubular. In other embodiments, however, the composition e formulated offsite and transported to a worksite, in which case the composition is introduced to the tubular via the pump directly from its shipping container (e.g., a truck, a railcar, a barge, or the like) or from a transport pipeline. In either case, the composition is drawn into the pump, elevated to an appropriate pressure, and then introduced into the tubular for delivery to the subterranean formation.

With reference to FIG. 1, the composition directly or indirectly affects one or more components or pieces of equipment associated with a wellbore drilling assembly 100, according to one or more embodiments. While FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132

(e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The composition may be added to, among other things, a drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the composition is added to, among other things, a drilling fluid 122 at any other location in the drilling assembly 100. In at least one embodiment, for example, there is more than one retention pit 132, such as multiple retention pits 132 in series. Moreover, the retention pit 132 can represent one or more fluid storage facilities and/or units where the composition may be stored, reconditioned, and/or regulated until added to a drilling fluid 122.

As mentioned above, the composition may directly or indirectly affect the components and equipment of the drilling assembly 100. For example, the composition may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition.

The composition may directly or indirectly affect the pump 120, which is intended to represent one or more of any conduits, pipelines, trucks, tubulars, and/or pipes used to fluidically convey the composition downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition may also directly or indirectly affect the mixing hopper 134 and the retention pit 132 and their assorted variations.

The composition can also directly or indirectly affect various downhole equipment and tools that comes into contact with the composition such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition may also directly or indirectly affect any downhole heat exchangers, valves and corresponding actuation devices, tool seals, packers and other wellbore isolation devices or components, and the like associated with the wellbore 116.

While not specifically illustrated herein, the composition may also directly or indirectly affect any transport or delivery equipment used to convey the composition to the drilling assembly 100 such as, for example, any transport vessels, conduits, pipelines, trucks, tubulars, and/or pipes used to fluidically move the composition from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

Figure 2:
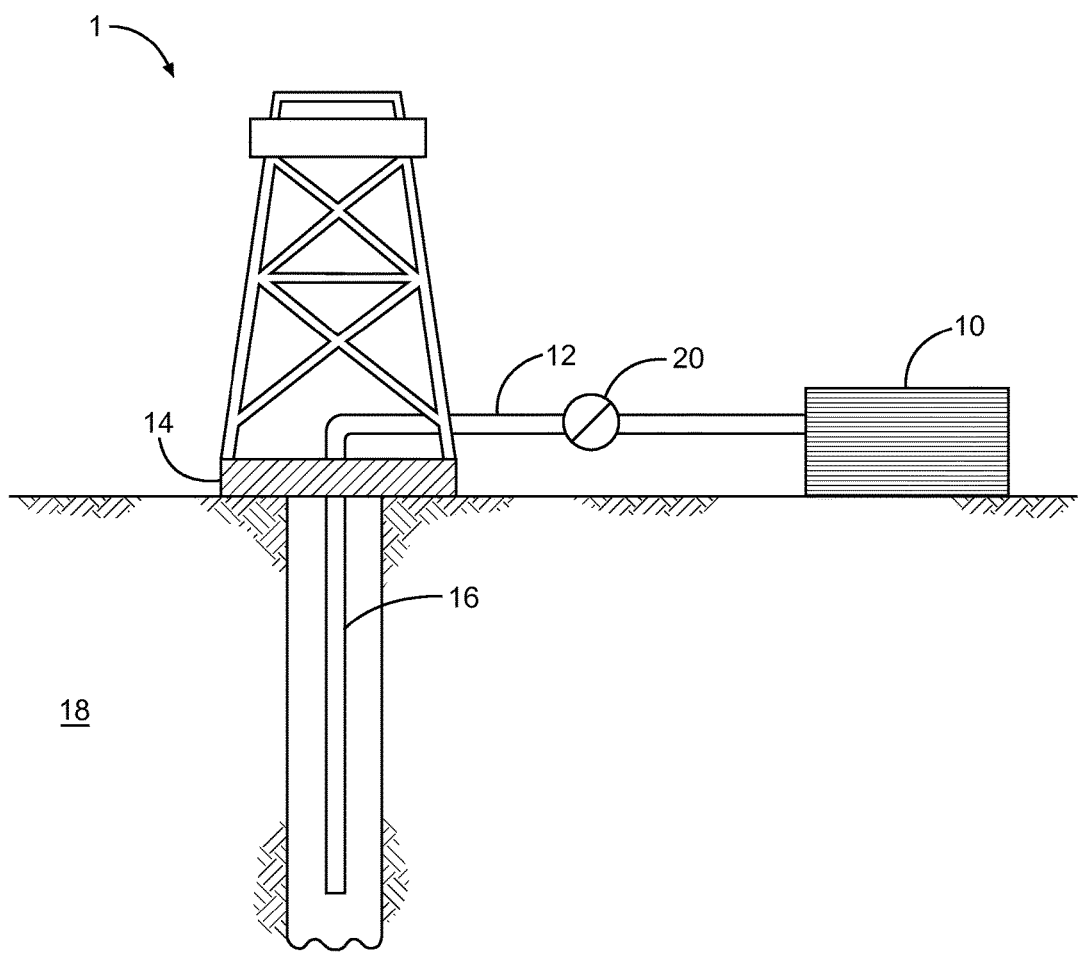
FIG. 2 illustrates a system for delivering a composition to a subterranean formation in accordance with various embodiments.

FIG. 2 shows an illustrative schematic of systems that can deliver embodiments of the compositions of the present invention to a subterranean location, according to one or more embodiments. It should be noted that while FIG. 2 generally depicts a land-based system or apparatus, like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of various components therein. In some embodiments, the composition that has flowed back to wellhead 14 can subsequently be recovered, and in some examples reformulated, and recirculated to subterranean formation 18.

The composition of the invention can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

The following exemplary embodiments are provided, the numbering of which is not to be construed as designating levels of importance:

Embodiment 1 is a method of treating a subterranean formation, comprising placing a composition comprising proppant particles into the subterranean formation, and wherein at least a portion of proppant particles is coated with a hardened resin that is a cured product of a curable composition comprising:
(A) a curable epoxy resin;
(B) a hardening agent; and
(C) an organosilicon compound.

Embodiment 2 relates to embodiment 1, wherein the organosilicon compound is selected from the group consisting of an aminosilane, an epoxy silane, an organohalogen silane, an organosilane ester, a silyl acetamide, a cyclosiloxane, a cyclosilazane, a silazane, and combinations thereof.

Embodiment 3 relates to embodiment 1 or 2, wherein the organosilicon compound is an amino silane or an epoxy silane.

Embodiment 4 relates to any one of embodiments 1-3, wherein at least one silicon (Si) atom in the organosilicon compound is bonded to at least one hydroxyl (—OH) group.

Embodiment 5 relates to any one of embodiments 1-4, wherein at least each of two silicon (Si) atoms in the organosilicon compound is bonded to at least one hydroxyl (—OH) group.

Embodiment 6 relates to any one of embodiments 1-5, wherein the organosilicon compound conforms to Formula I:

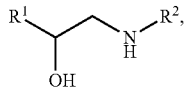

(I)

wherein
$R^1$ and $R^2$ are independently selected from optionally substituted alkyl and optionally substituted aryl;
each instance of optionally substituted alkyl is optionally interrupted by one or more of O, S, and —NH—; and
at least one of $R^1$ and $R^2$ is substituted by at least one moiety of the formula —Si(OR)—$X_{3-n}$ wherein
each R is independently selected from OH, alkyl, cycloalkyl, and aryl, wherein at least one R is OH;
X is halo; and
n is 1, 2, or 3.

Embodiment 7 relates to embodiment 6, wherein each of $R^1$ and $R^2$ is an optionally substituted alkyl, at least one of which alkyl is terminally-substituted by said moiety of the formula —Si(OR)$_n$X$_{3-n}$.

Embodiment 8 relates to embodiment 6 or 7, wherein each of $R^1$ and $R^2$ is terminally-substituted by said moiety of the formula —Si(OR)$_n$X$_{3-n}$.

Embodiment 9 relates to embodiment 7 or 8, wherein n is 3.

Embodiment 10 relates to any one of embodiments 6-9, wherein each R is OH.

Embodiment 11 relates to any one of embodiments 1-10, wherein the organosilicon compound conforms to Formula A:

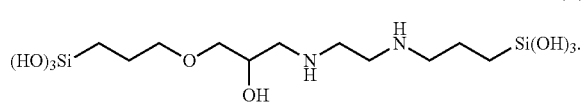

(A)

Embodiment 12 relates to any one of embodiments 1-3, wherein the curable resin is selected from the group consisting of:
the product of reaction between epichlorohydrin, bisphenol A, and at least one plant oil,
a polyepoxide resin, and
combinations thereof.

Embodiment 13 relates to any one of embodiments 1-12, wherein the hardening agent is selected from the group consisting of:
diethyl toluene diamine,
a cycloalkylamine,
3-(aminomethyl)-3,5,5-trimethylcyclohexanamine,
4,4'-Diaminodiphenylsulfone,
polyethylene amine,
a composition comprising a polyamine, ethylene diamine, and bisphenol A, and
combinations thereof.

Embodiment 14 relates to any one of embodiments 1-13, wherein the weight ratio of curable resin to hardening agent is about 8:2 to about 2:8.

Embodiment 15 relates to any one of embodiments 1-14, wherein the weight ratio is about 8:2 to about 1:1.

Embodiment 16 relates to any one of embodiments 1-15, wherein the weight ratio is about 8:2 to about 4:2.

Embodiment 17 relates to any one of embodiments 1-16, wherein the weight ratio is about 7:2 to about 5:2.

Embodiment 18 relates to any one of embodiments 1-17, wherein the weight ratio is about 7:3.

Embodiment 19 relates to embodiment 1, wherein the curable resin is a polyepoxide resin and the hardening agent is a cycloalkylamine.

Embodiment 20 relates to embodiment 1, wherein the curable resin is the product of reaction between epichlorohydrin, bisphenol A, and a plant oil, and the hardening agent is diethyl toluene diamine.

Embodiment 21 relates to embodiment 1, wherein the curable resin is the product of reaction between epichlorohydrin and bisphenol A, and the hardening agent is 3-(amino methyl)-3,5,5-trimethylcyclohexanamine.

Embodiment 22 relates to embodiment 20, wherein the plant oil is selected from a vegetable oil, an epoxidized vegetable oil, an epoxy derivative of a monoglyceride of vegetable oil, fruit oil, wood oil, and combinations thereof.

Embodiment 23 relates to embodiment 22, wherein the plant oil is one selected from linseed oil, soybean oil, palm oil, coconut oil, argemone oil, pongamia oil, jatropha oil, laurel oil, neem oil, cottonseed oil, vernonia oil, *Annona squamosa* oil, *Catunaregam nilotica* oil, rubber seed oil, crabe oil, *J. curcas* oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof.

Embodiment 24 relates to embodiment 23, wherein the plant oil is soybean oil.

Embodiment 25 relates to any one of embodiments 1-24, wherein the hardened resin is present in the composition in a concentration of about 0.5% to about 10% by volume, based on the total weight of the composition.

Embodiment 26 relates to any one of embodiments 1-25, wherein the concentration is about 1% to about 5%.

Embodiment 27 relates to any one of embodiments 1-26, wherein the concentration is about 2% to about 3%.

Embodiment 28 relates to any one of embodiments 1-27, wherein the organosilicon compound is present in the composition in a concentration of about 0.1% to about 10% by volume, based on the total weight of the composition.

Embodiment 29 relates to any one of embodiments 1-28, wherein the concentration is about 1% to about 5%.

Embodiment 30 relates to any one of embodiments 1-29, wherein the concentration is about 2% to about 3%.

Embodiment 31 relates to embodiment 1, wherein the contacting comprises placing the composition in at least one of a fracture and flow path in the subterranean formation.

Embodiment 32 relates to embodiment 1, wherein the fracture is present in the subterranean formation at the time when the composition is contacted with the subterranean formation.

Embodiment 33 relates to embodiment 32, wherein the method further comprises forming the fracture or flow path.

Embodiment 34 relates to embodiment 1, wherein the contacting comprises gravel packing.

Embodiment 35 relates to embodiment 34, further comprising fracturing the subterranean formation to form at least one fracture in the subterranean formation.

Embodiment 36 relates to embodiment 35, wherein the composition further comprises a carrier fluid.

Embodiment 37 relates to embodiment 1, further comprising combining the composition with an aqueous or oil-based fluid comprising a fracturing fluid, spotting fluid, clean-up fluid, completion fluid, remedial treatment fluid, abandonment fluid, pill, cementing fluid, packer fluid, or a combination thereof.

Embodiment 38 relates to any one of embodiments 1-37, wherein the proppant particles comprise natural sand.

Embodiment 39 relates to any one of embodiments 1-38, wherein the curable composition is cured prior to said contacting.

Embodiment 40 relates to any one of embodiments 1-38, wherein the curable composition is cured after said contacting.

Embodiment 41 relates to embodiment 1, further comprising:
placing a tubular in the subterranean formation; and
pumping the composition through the tubular and into the subterranean formation using a pump.

Embodiment 42 is a system for treating a subterranean formation, comprising:
proppant particles, wherein at least a portion of proppant particles is coated with a hardened resin that is a cured product of a curable composition comprising:
(A) a curable epoxy resin;
(B) a hardening agent; and
(C) an organosilicon compound;
a tubular disposed in the subterranean formation; and
a pump configured to pump the composition in the subterranean formation through the tubular.

EXAMPLES

Various embodiments of the present invention can be better understood by reference to the following Example that is offered by way of illustration. The present invention is not limited to the Example given herein.

Example 1

The purpose of this example is to compare the unconfined compressive strength (UCS) of inventive compositions (samples 2 and 3) to a conventional resin-coated proppant (sample 1) lacking an organosilicon compound.

Sample 1.

A 10 gram sample of Saudi sand (20/40 natural sand available from Adwan) was dry coated uniformly with 3% (wt/wt) of Ecopoxy™ resin and hardener combination (Ecopoxy Systems, Canada). The weight ratio of resin to hardener in Ecopoxy™ is 7:3. The dry-coated sand was packed tightly into a 10 mL disposable syringe, and cured at 140° F. (60° C.) for 6 hours to produce a consolidated core.

Organosilane Additive.

Equimolar quantities of (3-glycidyloxypropyl)trimethoxysilane (GPTMS) and trimethoxysilylpropylethylenediamine (TMSPED) were mixed in water to yield a white powder of product A, which was then isolated and dried in a vacuum oven at 140° F. (60° C.):

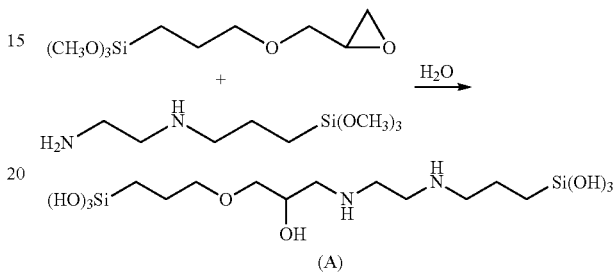

(A)

Sample 2.

Following the procedure of Example 1, a separate 10 gram sample of sand was dry coated with 3% (wt/wt) of Ecopoxy™ resin and hardener and 10 mg of Product A prepared in the manner described above. The coated sand was then cured at 140° F. (60° C.) for 6 hours to produce a consolidated core.

Sample 3.

Following the procedure of Example 1, another separate 10 gram sample of sand was dry coated with 3% (wt/wt) of Ecopoxy™ resin and hardener and 10 mg of GPTMS. The coated sand was then cured at 140° F. (60° C.) for 6 hours to produce a consolidated core.

Each coated sand sample was poured into a syringe and the plunger pushed until the sand was packed reasonably tightly. Then the syringe was subjected to test condition of temperature and duration. Resin coated sand was cured in absence of any liquid medium like water, fracturing fluid, etc. The samples were cured in dry conditions in a normal convection oven. After 6 hours of curing, the syringe was cooled to room temperature and carefully cut open to remove the consolidated resin coated sand core from the syringe. Before UCS measurement, care was taken to ensure that the core surface was square faced and flat, where the core typically exhibits ratio of length to diameter of about 1:1.5. UCS measurements were taken using a Hualong measuring instrument. Table 1 below tabulates the results of the strength test.

TABLE 1

| Sample | Resin/Hardener | Organosilicon Compound | Resin/hardener concentration (wt %) | Ratio resin:hardener | Dry UCS (psi) |
|---|---|---|---|---|---|
| 1 | Ecopoxy™ | none | 3 | 7:3 | 1058 |
| 2 | Ecopoxy™ | Product A (10 mg) | 3 | 7:3 | 1280 |
| 3 | Ecopoxy™ | GPTMS (10 mg) | 3 | 7:3 | 1189 |

The results demonstrate that silane additives significantly improve the strength of resin coating on sand.

The invention claimed is:

1. A method of treating a subterranean formation, comprising:
    placing a composition comprising proppant particles into the subterranean formation, wherein the proppant particles are coated with a hardened resin that is a cured product of a curable composition comprising:
    a curable epoxy resin,
    a hardening agent, and
    an organosilicon compound of Formula I:

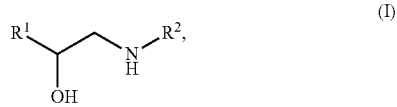

(I)

wherein:
        each $R^1$ and $R^2$ is independently selected from optionally substituted alkyl or optionally substituted aryl,
        each instance of optionally substituted alkyl is optionally interrupted by one or more of O, S, and —NH—, and
        at least one of $R^1$ and $R^2$ is substituted by at least one moiety having a formula —Si(OR)$_n$X$_{3-n}$, wherein:
            each R is independently selected from OH, alkyl, cycloalkyl, and aryl, wherein at least one R is OH,
            X is halo, and
            n is 1, 2, or 3; and
    fracturing the subterranean formation to form at least one fracture in the subterranean formation.

2. The method of claim 1, wherein each of $R^1$ and $R^2$ is an optionally substituted alkyl, at least one of which alkyl is terminally-substituted by said moiety of the formula —Si(OR)$_n$X$_{3-n}$.

3. The method of claim 2, wherein each of $R^1$ and $R^2$ is terminally-substituted by said moiety of the formula —Si(OR)$_n$X$_{3-n}$.

4. The method of claim 3, wherein n is 3.

5. The method of claim 4, wherein each R is OH.

6. The method of claim 5, wherein the organosilicon compound is of Formula A:

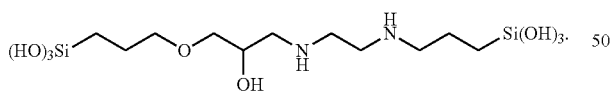

(A)

7. The method of claim 1, wherein the curable epoxy resin is selected from the group consisting of: a product of reaction between epichlorohydrin, bisphenol A, and a plant oil; a polyepoxide resin; and a combination thereof.

8. The method of claim 1, wherein the hardening agent is selected from the group consisting of:
    diethyl toluene diamine;
    a cycloalkylamine;
    3-(aminomethyl)-3,5,5-trimethylcyclohexanamine;
    4,4'-diaminodiphenylsulfone;
    polyethylene amine;
    a composition comprising a polyamine, ethylene diamine, and bisphenol A; and
    any combination thereof.

9. The method of claim 1, wherein the curable resin and the hardening agent is present in a weight ratio of curable resin to hardening agent ranging from about 8:2 to about 1:1.

10. The method of claim 1, wherein the curable resin and the hardening agent is present in a weight ratio of curable resin to hardening agent ranging from about 7:2 to about 5:2.

11. The method of claim 1, wherein the curable epoxy resin comprises a polyepoxide resin and the hardening agent comprises a cycloalkylamine.

12. The method of claim 1, wherein the curable epoxy resin comprises a product of reaction between epichlorohydrin and bisphenol A, and the hardening agent comprises 3-(aminomethyl)-3,5,5-trimethylcyclohexanamine.

13. The method of claim 1, wherein the curable epoxy resin comprises a product of reaction between epichlorohydrin, bisphenol A, and a plant oil, and the hardening agent comprises diethyl toluene diamine.

14. The method of claim 13, wherein the plant oil comprises a vegetable oil, an epoxidized vegetable oil, an epoxy derivative of a monoglyceride of vegetable oil, a fruit oil, a wood oil, or any combination thereof.

15. The method of claim 1, wherein the hardened resin is present in the composition in a concentration of about 0.5% to about 5% by volume, based on the total weight of the composition.

16. The method of claim 1, wherein the organosilicon compound is present in the composition in a concentration of about 0.1% to about 5% by volume, based on the total weight of the composition.

17. The method of claim 1, further comprising:
    placing a tubular in the subterranean formation; and
    pumping the composition through the tubular and into the subterranean formation using a pump.

18. A system for performing the method of claim 1, the system comprising:
    a tubular disposed in the subterranean formation; and
    a pump in fluid communication with the composition placed in the subterranean formation.

19. A method of treating a subterranean formation, comprising:
    placing a composition comprising proppant particles into the subterranean formation, wherein the proppant particles are coated with a hardened resin that is a cured product of a curable composition comprising:
    a curable epoxy resin comprising a product of reaction between epichlorohydrin and bisphenol A,
    a hardening agent, and
    an organosilicon compound of Formula A:

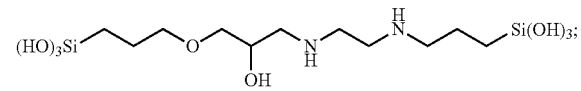

(A)

and fracturing the subterranean formation to form at least one fracture in the subterranean formation.

20. A composition for treating a subterranean formation, comprising:
    proppant particles coated with a hardened resin that is a cured product of a curable composition comprising:
    a curable epoxy resin,
    a hardening agent, and an organosilicon compound of Formula I:

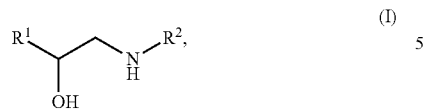

wherein:
   each $R^1$ and $R^2$ is independently selected from optionally substituted alkyl or optionally substituted aryl,
   each instance of optionally substituted alkyl is optionally interrupted by one or more of O, S, and —NH—, and
   at least one of $R^1$ and $R^2$ is substituted by at least one moiety having a formula —Si(OR)$_n$X$_{3-n}$, wherein:
      each R is independently selected from OH, alkyl, cycloalkyl, and aryl, wherein at least one R is OH,
      X is halo, and
      n is 1, 2, or 3.

* * * * *